United States Patent [19]
Leonard

[11] 3,757,955
[45] Sept. 11, 1973

[54] MULTI-LAYER MEMBRANE TYPE MASS TRANSFER DEVICE AND PROCESS

[75] Inventor: Ronald James Leonard, Elk Grove Village, Ill.

[73] Assignee: Baxter Laboratories, Inc., Morton Grove, Ill.

[22] Filed: Aug. 9, 1971

[21] Appl. No.: 170,163

Related U.S. Application Data

[63] Continuation-in-part of Ser. No. 73,524, Sept. 18, 1970, which is a continuation-in-part of Ser. No. 825,348, May 16, 1969, abandoned.

[52] U.S. Cl.............. 210/321, 23/258.5, 210/493, 264/257
[51] Int. Cl............................................. B01d 31/00
[58] Field of Search............... 210/22, 321, 493; 23/258.5; 264/257, 286

[56] References Cited
UNITED STATES PATENTS

| | | | |
|---|---|---|---|
| 3,442,388 | 5/1969 | Pall | 210/493 X |
| 3,266,223 | 8/1966 | Dresser et al. | 55/158 |
| 3,370,710 | 2/1968 | Bluemle, Jr. | 210/493 X |
| 3,396,849 | 8/1968 | Lande et al. | 210/321 |

*Primary Examiner*—Frank A. Spear, Jr.
*Attorney*—W. Garrettson Ellis

[57] ABSTRACT

A foldable cardboard backing is secured to one surface of a flexible mass transfer membrane to enable rapid formation of a folded multi-layered device by compressing the backing and membrane connected thereto into folds and then fixing the folds by sealing their ends.

45 Claims, 24 Drawing Figures

Patented Sept. 11, 1973  3,757,955

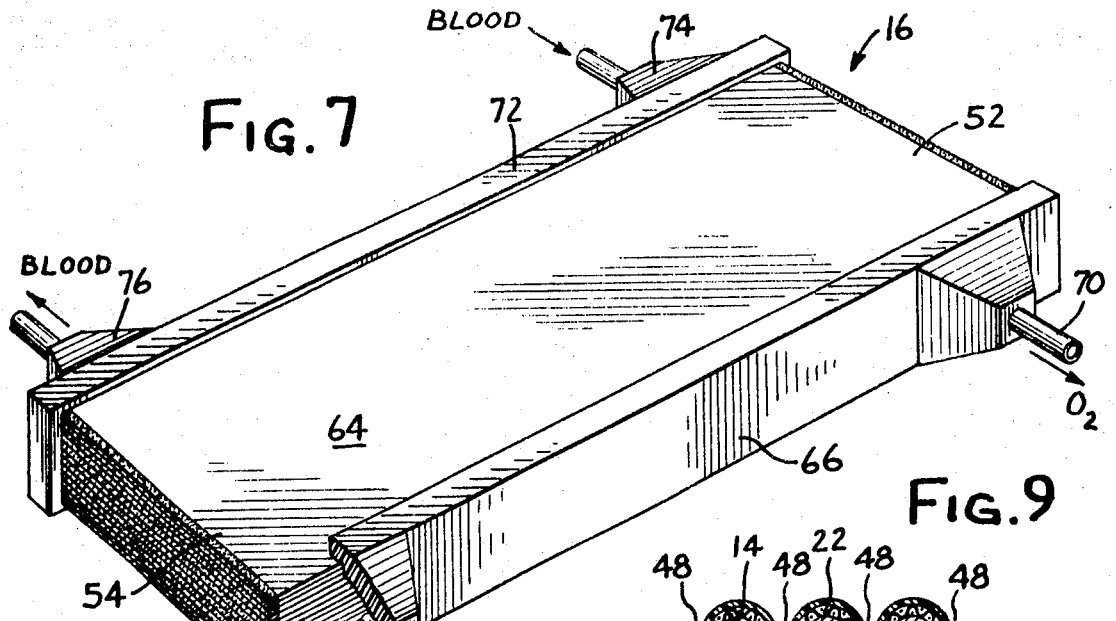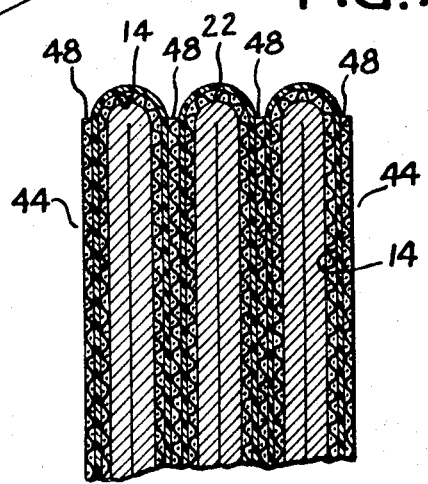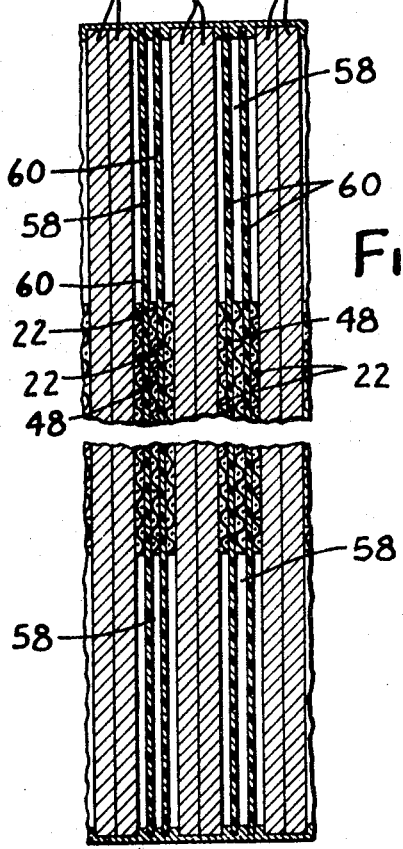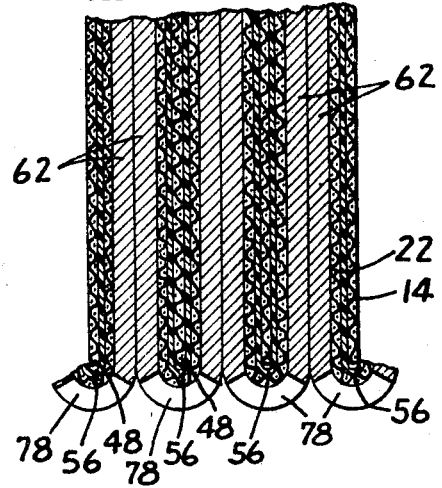

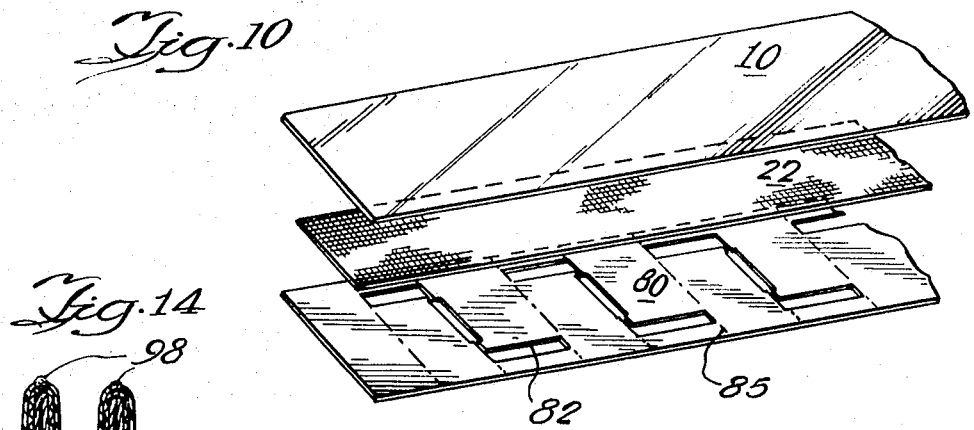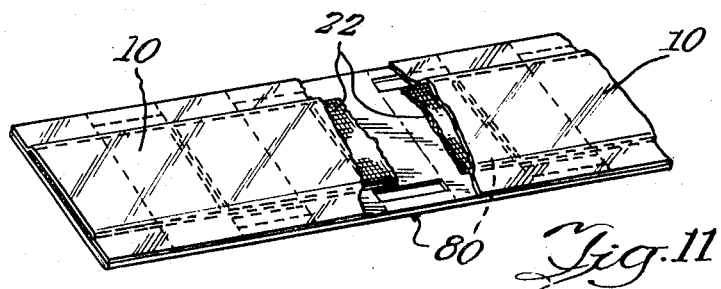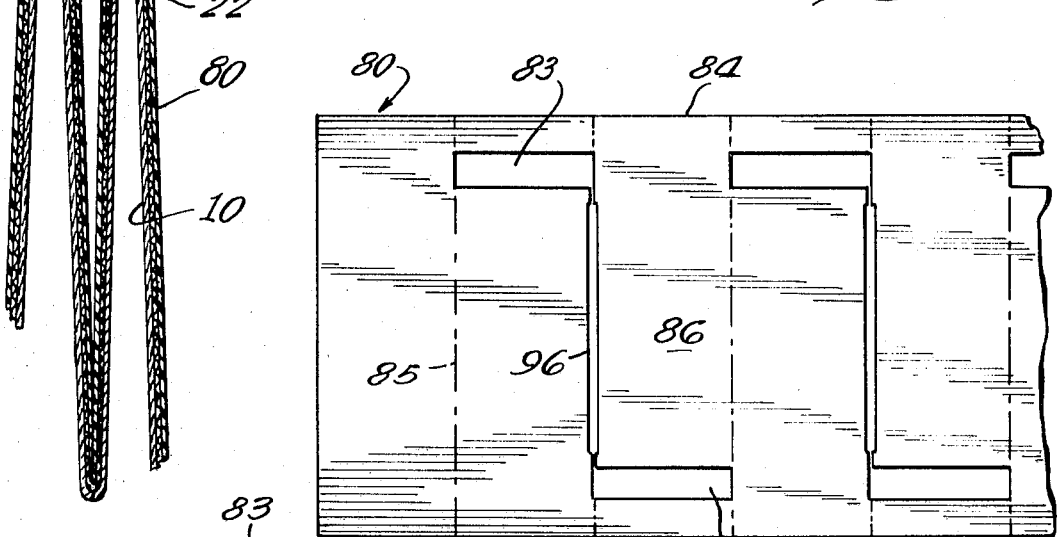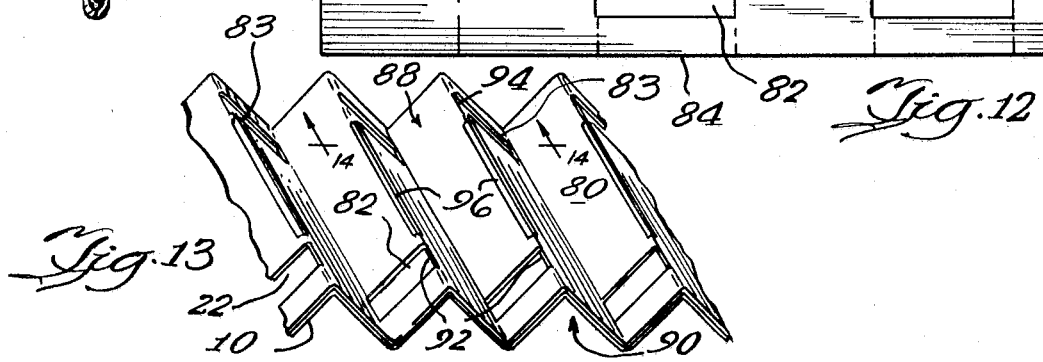

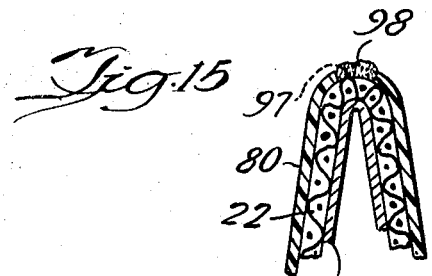
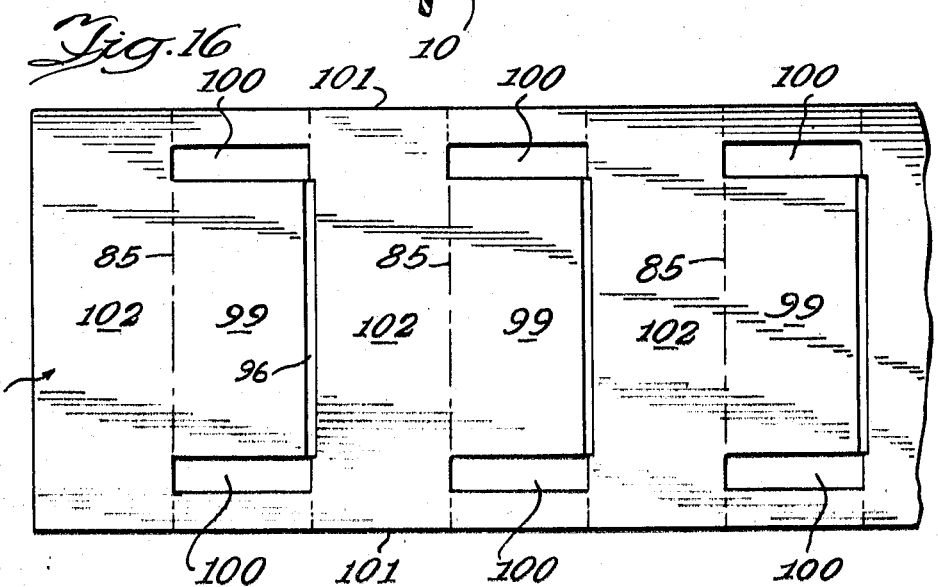
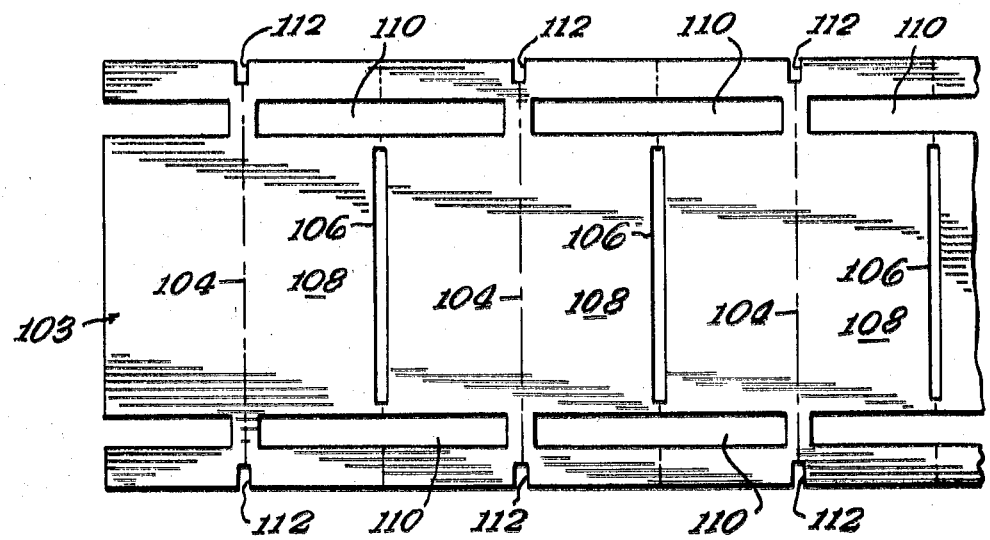

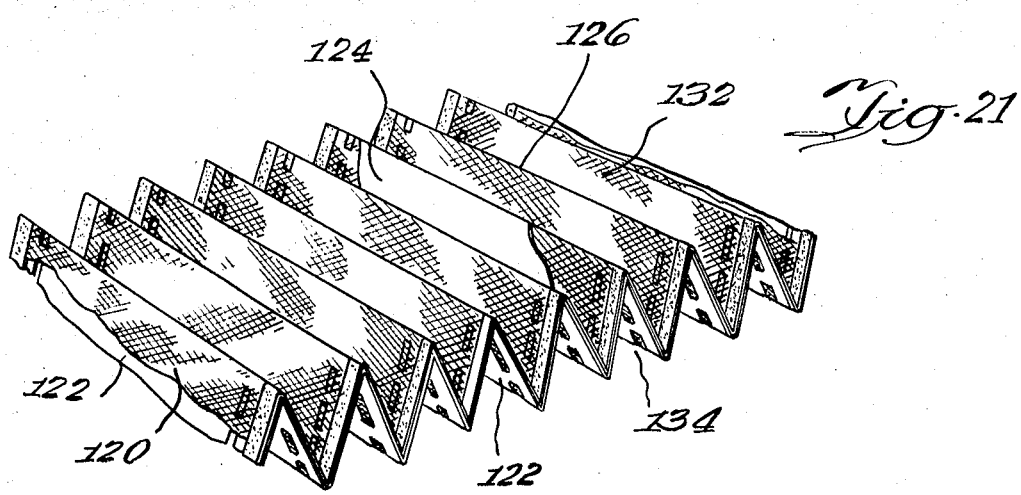
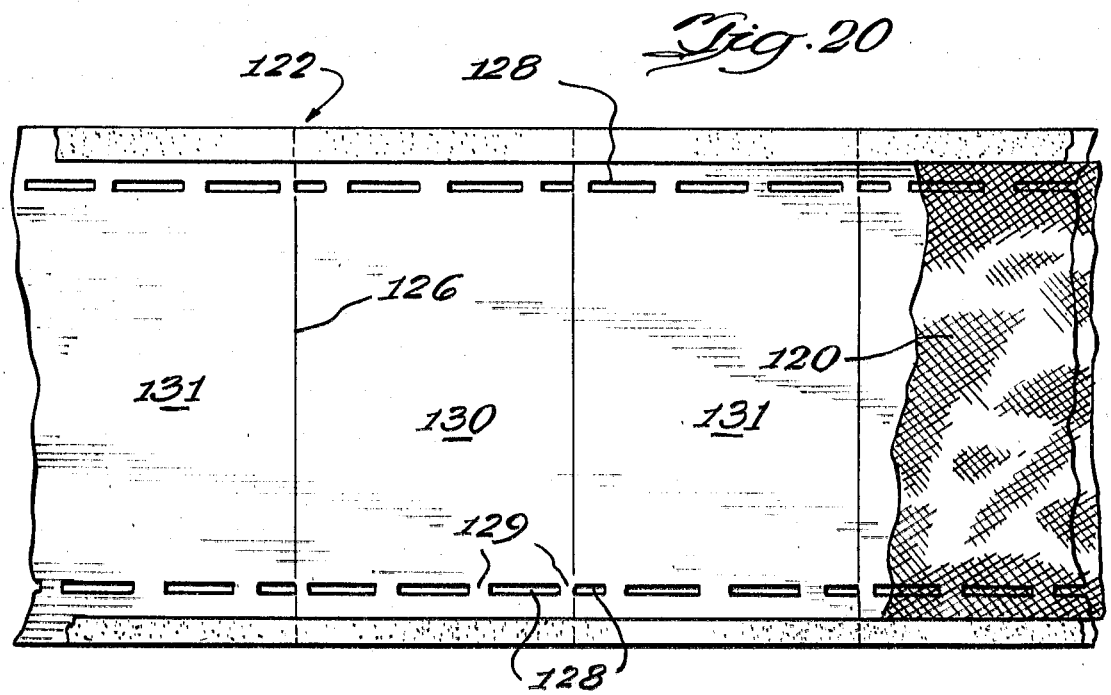
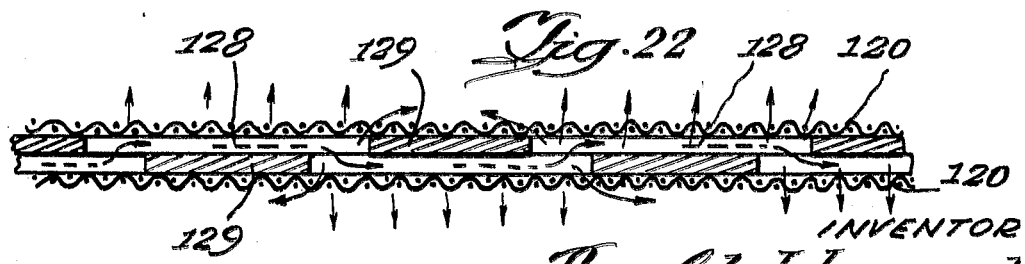

Patented Sept. 11, 1973

INVENTOR
Ronald J. Leonard

MULTI-LAYER MEMBRANE TYPE MASS TRANSFER DEVICE AND PROCESS

CROSS REFERENCE TO RELATED APPLICATION

This application is a continuation-in-part of U.S. application Ser. No. 73,524, filed Sept. 18, 1970, which, in turn, is a continuation-in-part of U.S. application Ser. No. 825,348, filed May 16, 1969, now abandoned.

BACKGROUND OF THE INVENTION

This invention relates to mass transfer. Particularly, it relates to a mass transfer device of the type having a plurality of layers formed from a flexible folded semipermeable membrane to provide two sets of interconnected pockets for plural paths of flow for a first fluid along one surface of the membrane and plural paths of flow of a second fluid along the other surface of the membrane.

Devices of the designated type have been successfully used as extracorporeal oxygenators of blood in which both oxygen and $CO_2$ are transferred in opposite directions across a membranous barrier separating the blood and the oxygen. Representative of the state of the prior art are U.S. Pat. Nos. 3,370,710; 3,396,849; 3,318,747; and a copending U.S. Patent application Ser. No. 712,066, filed March 6, 1968, assigned to the assignee of the present application.

According to the first patent, a pleated semipermeable membrane is assembled with tie bolts for holding the membrane pleats in a compressed condition. The unit thus formed is secured within a housing fashioned for managing flow of blood and oxygen therethrough. Within the unit, blood flows along random paths so that there is no assurance of uniformity of gas exchange.

The second patent and the copending application are for oxygenators with membrane supports disposed in the pockets formed along the oxygen engaging surface. These supports provide orderly flow paths for blood across membrane layers. For example, in said copending application each support member is fashioned with cross strands which produce flow channels arranged for maximum gas transfer. But a folded membrane is a difficultly controlled structure; and its management according to heretofore known technique while inserting the membrane supports during assembly of a mass transfer device is, at best, burdensome. Reflected costs of overcoming the difficulty tend to place prior oxygenators beyond the economic capability of many potential users and economically burden others.

SUMMARY OF THE INVENTION

In accordance with the present invention, the control of folded membranes during assembly of mass transfer devices of the described class is facilitated, and costs of such devices are correspondingly minimized. To effect the invention, a fexible semipermeable membrane for a mass transfer device, such as a diffusion cell of the type characterized by a plurality of membrane layers having two separated sets of oppositely directed interconnected openings forming plural paths on opposed membrane surfaces for separated flow of a first fluid and a second fluid, respectively, is secured to one surface of a stiff backing in overlying relationship therewith. To obtain this structure, a membrane and the backing are folded into plurality of pleats to form two sets of oppositely opening pockets. The opposite ends of the pockets are then sealed; and one set is connected to inlet and outlet means for a first fluid and the other set of pockets is connected to inlet and outlet means for a second fluid.

BRIEF DESCRIPTION OF THE DRAWINGS

FIG. 7 is a perspective view of said mass transfer device with manifolds added.

FIG. 8 is an enlarged sectional view according to the line 8—8 on FIG. 6, with parts broken away to conserve drawing area.

FIG. 9 is an enlarged sectional view according to line 9—9 on FIG. 6, with parts broken away to conserve drawing area.

FIG. 10 is an exploded perspective view of a mass transfer device incorporating another embodiment of the stiff backing used in this invention.

FIG. 11 illustrates the three layers of FIG. 10 assembled and taped together.

FIG. 12 is a detailed plan view of a portion of the stiff backing used in FIG. 10.

FIG. 13 is an inverted perspective view of the assembled structure of FIG. 11 in its pleated configuration.

FIG. 14 is a detailed sectional view taken along line 14—14 in FIG. 13.

FIG. 15 is a highly magnified detail at the top of FIG. 14.

FIG. 16 is a detailed plan view of a portion of another embodiment of the stiff backing used in this invention.

FIG. 17 is a detailed plan view of a portion of still another embodiment of the stiff backing used in this invention.

FIG. 20 is a detailed plan view of a portion of another embodiment of the stiff backing used in this invention.

FIG. 21 is an inverted perspective view of the assembled structure of FIG. 20 in its pleated configuration.

FIG. 22 is a detailed sectional view taken across a plane through the longitudinal dimension of the structure of FIG. 21, placed in completely folded position with the strip of support screen inserted, to show the relationship of the longitudinally extending cutaway portions therein.

DESCRIPTION OF PREFERRED EMBODIMENTS

Figure 1:
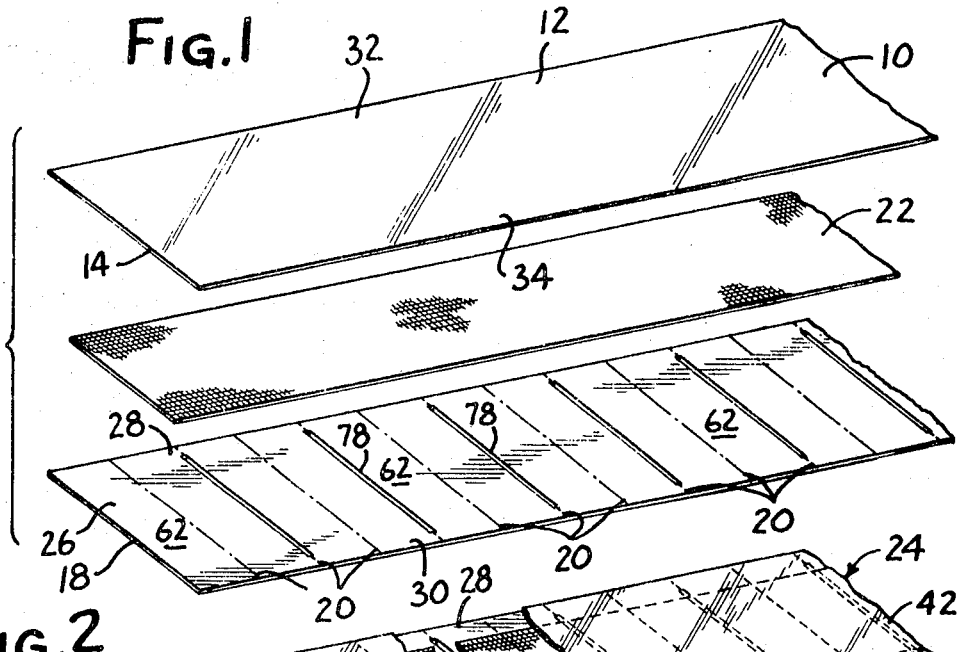
FIG. 1 is an exploded perspective view of portions of a membrane, spacer means, and a foldable stiff backing comprising a mass transfer device embodying the present invention.

Referring now more particularly to FIGS. 1 through 9, FIG. 1 shows a length of membrane 10 having, in terms of orientation with respect to FIG. 1, a top or blood engaging surface 12 and an opposed or gas engaging under surface 14. The membrane comprises mass transfer means in a mass transfer device such as an oxygenator 16 (FIG. 7); and is flexible and semipermeable for transmission of oxygen and carbon dioxide from opposed surfaces in opposite directions.

Oxygenator 16 is adapted for connection with a human circulatory system to enable extracorporeal oxygenation of blood. To that end, as will be apparent from ensuing description, membrane 10 is arranged to effectively separate two fluids so that blood will contact only surface 12, whereas (except for membrane transmitted gas) oxygen will contact only surface 14.

A length of a stiff backing 18, typically corresponding in dimensions to the membrane 10, is weakened by a plurality of transversely extending, equally spaced parallel score lines 20 along which the backing may be folded or pleated into a plurality of uniformly dimensioned segments 62. The backing may be of paperboard about the thickness of a conventional shirt stiffener. A hydrophobic coating or sealer such as polyethylene and the like may be applied to the surfaces of the backing. The backing is disposed adjacent surface 14 longitudinally of membrane 12.

A length of flexible spacer 22 is disposed between surface 14 and backing 18. Preferably it is the same length as the membrane, but narrower. The spacer 22 can preferably be plastic, fluid-permeable screening or netting made of crossed, woven or nonwoven strands for providing flow channels in and along the membrane 10 when the latter is forced into engagement with the spacer as pressurized blood or other fluid is passed along one side of the membrane 10. Suitable nonwoven netting comprising two sets of parallel strands lying against each other, each set in a different plane and defining an angle to the other set, is commercially available under the trademark Polynet, from Nordeutschen Seekabelwerke Nordenham, of West Germany. Suitable woven netting or screening made from vinyl-coated glass fibers or monofilament nylon fibers is also commercially available. Woven screening is generally preferred for use in the blood oxygenator disclosed herein, while the above nonwoven netting is preferred if the device is to be used as a dialyzer for blood. Alternatively, spacer 22 can be a flexible sheet of plastic or the like having protrusions or ridges on the membrane side to define fluid flow channels, for example, similar to the type shown in U.S. Pat. No. 3,077,268, but with protrusions typically on only the one side facing the membrane 10.

From the components of FIG. 1, a subassembly 24 (FIG. 2) is produced by securing spacer 22 to the membrane proximate surface 26 of backing 18 in a manner such that a pair of parallel margins 28 and 30 are formed longitudinally of the backing. The securance may be through the agency of any suitable adhesive, such as an RTV (room temperature vulcanizable) silicone rubber. Membrane 10 overlies the backing and is arranged with its surface 14 disposed against spacer 22. Its opposite side portions 32 and 34 overhang said spacer and are sealed to opposite side margins 28 and 30 of said backing, preferably with the above stated adhesive. Its opposite ends are sealed to ends 40 and 42 of said backing.

Figure 3:
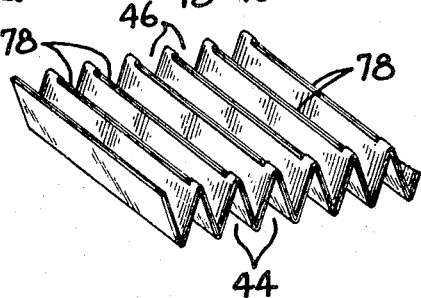
FIG. 3 is an inverted perspective view of said subassembly in a pleated stage of completion following the condition of FIG. 2.
Figure 5:
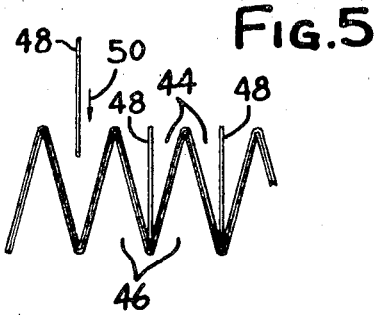
FIG. 5 is an elevational view illustrating the steps of assembling a plurality of dividers and said subassembly.
Figures 4, 6:
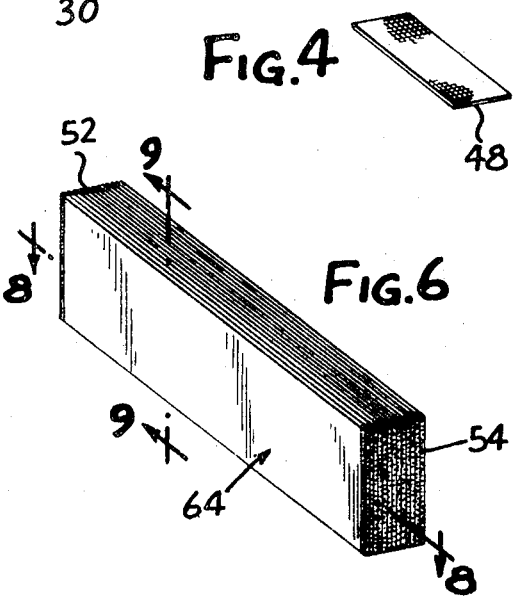
FIG. 4 is a perspective view of a flow divider.
FIG. 6 is a perspective view of a membranous unit in stage of completion following the condition of FIG. 5.

Subassembly 24 thus fashioned then readily may be folded by manual compression, that is to say, by application of manual pressure to opposed ends 40 and 42 to produce a pair of sets 44 and 46 of oppositely opening pockets, only some of which are numbered (FIGS. 3 and 5). Each pocket of set 44 is lined with a pair of adjacent membrane sections or layers and each pocket of set 46 is lined with a stiffener comprised of a pair of adjacent backing segments 62. Generally, backing 18 is prefolded into convoluted form before assembly into subassembly 24, and then stretched out again to receive membrane 10. The subassembly 24 is then readily convoluted without effort and without vigorous manipulation and abrasion which is likely to damage membrane 10.

The subassembly 24 thus folded is readily manageable and may be loosely hand or machine held while a flow divider 48 (FIGS. 4, 5, 8, and 9) may be inserted into each pocket 44 in the direction of arrow 50 (FIG. 5). Each flow divider may be fabricated from the same material as that of spacer 22. After all of the flow dividers have been inserted, the subassembly 24 is completely manually compressed and its opposite ends 52 and 54 are secured and sealed as by potting with a suitable sealant such as RTV silicone rubber while the subassembly continues to be hand or machine held. Thereby, the opposite ends of pockets 44 and 46 are closed and a membranous unit 64 (FIG. 6) is formed with its pockets opening toward opposite sides of said unit and defining a plurality of parallel flow paths for blood and oxygen in separated pockets as shown in said copending application.

The length of dividers 48 is such that pockets 44 are filled from their inner angles 56 (FIG. 9) to their openings. However, the width of each divider is about the same as the width of spacer 22, so that a pair of spaces 58 (FIG. 8) are formed in each pocket 44 between adjacent membrane sections or layers of such pocket. Spaces 58 register with portions 60 of the sections of membrane 10 which are not supported by spacer 22 because of its narrower width, aforedescribed. In consequence, normal blood pressure in pockets 44 will cause the membrane portions 60 to balloon out beyond spacer 22 at opposite ends 52 and 54 of unit 64.

An oxygen manifold 66 is rigidly secured to one side of the diffusion or exchange unit 64 in a manner such that a medial section of pockets 46 are sealed, leaving said pockets open at opposite end portions 52 and 54. The manifold has oxygen inlet means 68 and oxygen outlet means 70 arranged in communication with open ends of pockets 46.

A manifold 72 adapted for blood is rigidly secured to the other side of unit 64. It is fashioned to seal a medial part of pockets 44 so that said pockets are open only at opposite ends 52 and 54. Manifold 72 has blood inlet means 74 and blood outlet means 76 in communication with the open ends of pockets 44, the inlet and outlet means of the manifolds preferably being arranged for flow of blood and oxygen in opposite directions.

To enable oxygen to get through the backing which lines pockets 46, port means comprised of a plurality of elongated slots 78 (FIGS. 1, 3, and 9), only some of which are numbered, are provided in backing 18 at the folded angles between segments 62. The opposite end portions of said slots extend into margins 28 and 30 and are registered with inlet and outlet means 68 and 70. As a result, oxygen entering through the inlet 68 will pass through backing 18 and through the spacer 22 into contact with surface 14 of membrane 10.

While the mass transfer device specifically described above is an oxygenator, it will be apparent to those knowledgeable in the art that the inventive concept embodied therein is adaptable for other uses and purposes within the scope and spirit of the invention. For example, the mass transfer device of this invention can also be used as an artificial kidney.

When employed as an oxygenator, the semipermeable membrane in the mass transfer device is usually made of material impermeable to liquid but of sufficient permeability to allow carbon dioxide to pass from the blood and oxygen to pass to the blood. This material preferably is an elastomeric plastic material, such as silicone rubber, which is antithrombogenic or otherwise biologically inert. It can also be fabricated of a plastic base, for example, a mesh of glass or polyester fibers to which is applied a thin coating of said silicone rubber elastomer. Other particularly suitable materials for making the oxygenator membrane are thin polytetrafluoroethylene sheeting (preferably having small pores, e.g., less than 1 micron), a cast silicone rubber sheet, a cast sheet of a copolymer of silicone rubber and polycarbonate, and the like plastic materials.

When employed as an artificial kidney device, the semipermeable membrane is usually made of a material that is impermeable to the blood proteins but is permeable to nitrogenous bodily waste products such as urea, uric acid, water, and creatinine, which will then pass from the blood through the membrane and into the dialysis solution of suitable ionic concentration. Such materials as cellulosic products, e.g., cellophane or cuprophane, or synthetic hydrophobic or hydrophilic films, or foils capable of passing such waste products, can be readily employed.

The flow of the two fluids, which can be in either direction relative to each other in the oxygenator, are generally countercurrent to each other in the artificial kidney for most effective operation of the mass transfer device described herein.

The folded stiffener 18 which is employed for rigidifying the folded or pleated layers of the semipermeable membrane preferably is made of a paperboard of about 10 to 20 mils thickness, although other thicknesses can be used, depending in part upon the material of construction. The stiffener can also be made of materials such as, for example, plastics, e.g., polypropylene or polyethylene, vinyl plastics, or even a rubberized fabric material. Paperboard stiffeners or backings 18 are preferably coated with a plastic such as one of the above, or silicone rubber.

The spacer means 22 for defining flow channels in the folded or pleated layers of the semipermeable membrane can be sandwiched between the semipermeable membrane and the folded stiffener; it can be secured to one or both sides of the folded backing or stiffener; or it can comprise an embossed surface on one or both sides of the backing or stiffener. Such a structure might be made by gluing strands, screening, or netting to one surface of stiffener or backing 18. Alternatively, backing or stiffener 18 can be fabricated with a surface having strandlike or other irregularities corresponding to flexible spacer 22 integrally defined by the surface of backing 18. Such a union of backing 18 and spacer 22 into a single or laminated piece provides greater ease of assembly of the device of this application and substantial cost savings.

Securance of the spacer means to the backing or stiffener 18 and/or securance of the backing or stiffener to the membrane can be by threading, taping, or by use of adhesives such as RTV silicone rubber, epoxy cement, and the like adhesive materials which are compatible with the respective surfaces. To impart suitable flexibility to the spacer means 22 and 48, materials such as low density polyethylene, vinyl, or glass fibers coated with vinyl can be used in their construction.

FIGS. 10 through 15 show aspects of a mass transfer device similar to that of FIGS. 1 through 9 in which the backing 80 (which corresponds to backing 18 in the previous embodiment) defines longitudinally extending cutaway portions 82, 83 which are located adjacent longitudinal edges 84 of the panels 86 in backing 80. The purpose of cutaway portions 82, 83 is to facilitate the introduction of fluid to and from the convoluted space between the membrane 10 and backing 80. Transverse score lines 85 are provided for folding in a manner similar to that previously described.

Figure 2:
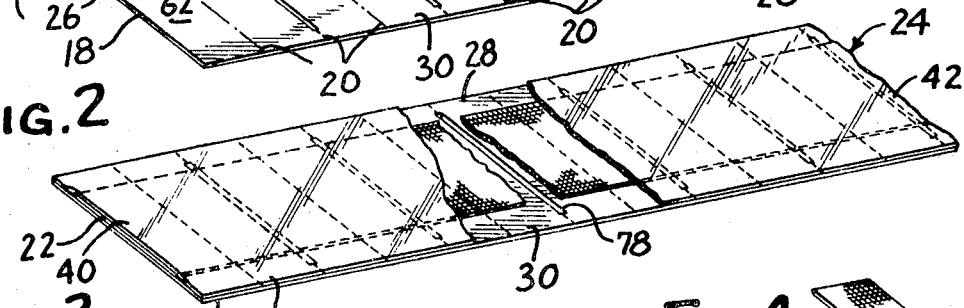
FIG. 2 is a perspective view of the components of FIG. 1 in subassembly form.

FIGS. 10 and 11 are similar to FIGS. 1 and 2 in that they both show membrane 10 and spacer 22 and the respective backings 18, 80 assembled in similar manner. Spacer 22 can be made narrow enough so that it does not overlie cutaway portions 82, 83. Flow dividers 48 can be utilized in the folded membrane device, if desired.

Referring to FIGS. 13 and 14, the assembled but incompletely folded device is shown in inverted position with respect to FIG. 11, with backing 80 at the top and membrane 10 and spacer 22 underneath. The upwardly and downwardly facing pockets 88, 90 are defined by folded backing 80 and the other parts. It can be seen that it is necessary for a fluid introduced into any of the set of pockets 88 to pass through backing 80 and then to pass along spacer 22 in the convoluted space between backing 80 and membrane 10 in order for mass transfer to take place with respect to fluid passing through pockets 90.

Cutaway portions 82, 83 provide the route of access for fluid in pockets 88 to pass through backing 80 into contact with membrane 10 in improved volume and with a high degree of spreading across the surface of the membrane. In use, the mass transfer device of FIG. 13 is tightly folded as in FIG. 6, which puts a degree of constriction into the flow path along membrane 10. This constriction is selectively relieved by cutaway portions 82, 83 to provide relatively large manifold-like areas in the membrane and spacer region adjacent cutaway portions 82, 83 to facilitate the rapid spreading of fluid entering into each pocket by way of entry ports 92 at the top of the folded backing 80 and cutaway portions 82, and the uniform collection of flowing fluid into cutaway portions 83 and its removal from exit ports 94.

For example, oxygen gas can be supplied to a tightly folded structure having an assembly similar to that of FIG. 13 by a manifold as shown in FIG. 7, from which manifold oxygen gas passes into ports 92. Because of the relief of constriction provided by cutaway portons 82, the oxygen or other fluid quickly migrates downwardly through the area defined within cutaway portions 82. From there the oxygen migrates transversely across and between membrane 10 and backing 80 toward cutaway portions 83, while undergoing mass transfer across membrane 10. The fluid then is collected in the manifoldlike areas within cutaway portions 83, from which it flows out of exit ports 94 and away from the device by way of the manifold system of FIG. 7, if desired. This system provides a wide, uniform flow path of fluid along membrane 10 for efficient mass transfer.

Cutaway portions 82, 83 also improve the flow distribution of fluid through pockets 90, since they selectively relieve pressure on the membrane adjacent the cutaway portions, providing a flow path of reduced resistance for fluid entering each pocket 90 to pass to the bottom of the pocket.

Additionally, backing 80 defines central, transversely extending cutaway portions 96, spaced from the longitudinal edges of backing 80 at alternate transverse foldlines of the backing. These can be used to eliminate an undesirable low resistance flow path which is defined (when there is no cutaway portion 96) by a linear space 97 (FIG. 15) between the apex of the fold of backing 80 and spacer 22. This linear space is created by the fact that spacer 22 is frequently incapable of forming as sharp a fold as is backing 80, thus causing the linear space to form. When such a space is formed, it provides a flow path of low resistance, permitting fluid to pass from entrance 92 to exit 94 without coming into intimate filming contact with membrane 10, as it is forced to do if it passes on a flow path which is deeper within pocket 88. Cutaway portions 96 permit the manufacturer to apply a small bead of adhesive sealant 98 into portions 96 to occlude the linear space 97 and thus to improve the mass transfer characteristics of the device.

Referring to FIG. 16, another embodiment of a stiff backing 95 is disclosed for use instead of backing 80. One set of alternating panels 99 defines pairs of longitudinally extending cutaway portions 100, each cutaway portion being positioned adjacent a separate longitudinal edge 101 of the backing. The remaining set of alternate panels 102 defines no longitudinally extending cutaway portions.

The backing of FIG. 16 defines scored fold lines 85 and transversely extending cutaway portions 96 similar to the backing of FIG. 12 and for the same purposes. FIG. 17 discloses another embodiment of a stiff backing 103 which can be used in place of previously described backings in a mass transfer device of this invention. The backing 103 has fold lines 104 and central, transversely extending, cutaway portions 106 similar to the stiff backing previously described. Additionally, each panel 108 defines a pair of cutaway portions 110 which communicate with a corresponding pair of cutaway portions in one adjacent panel. However, each pair of cutaway portions 110 is spaced from the fold line 104 connecting each panel in which said portions 110 are found from its other adjacent panel, so that each pair of cutaway portions in each panel 108 communicate only with the cutaway portions 110 of one adjacent panel. This structure provides a high degree of manifolding to permit fluid to pass through the stiff backing and to percolate uniformly through the spacer 22 against membrane 10 for mass transfer.

If desired, extra cutaway portions or slits 112 can be prepared to extend inwardly from the longitudinal edges of the backing at alternate fold lines to relieve stress on the membrane when folded with the backing. As transverse cutaway portions 106 can be used to provide access to fill the linear space which may be formed between the membrane and the spacer and the backing, cutaway portions 112 are provided to provide relief to the membrane at a point where otherwise it would undergo a severe amount of tension as the assembly is folded, to avoid breakage of the membrane. This tension is increased by the fact that the membrane is typically taped into place with the tape between backing and membrane, which increases the radius of curvature of the membrane about the fold lines 104, along which slits 112 are defined. The presence of slits 112 relieves this tension in the area where the presence of tape may cause an unduly large tension on the membrane.

Figure 18:
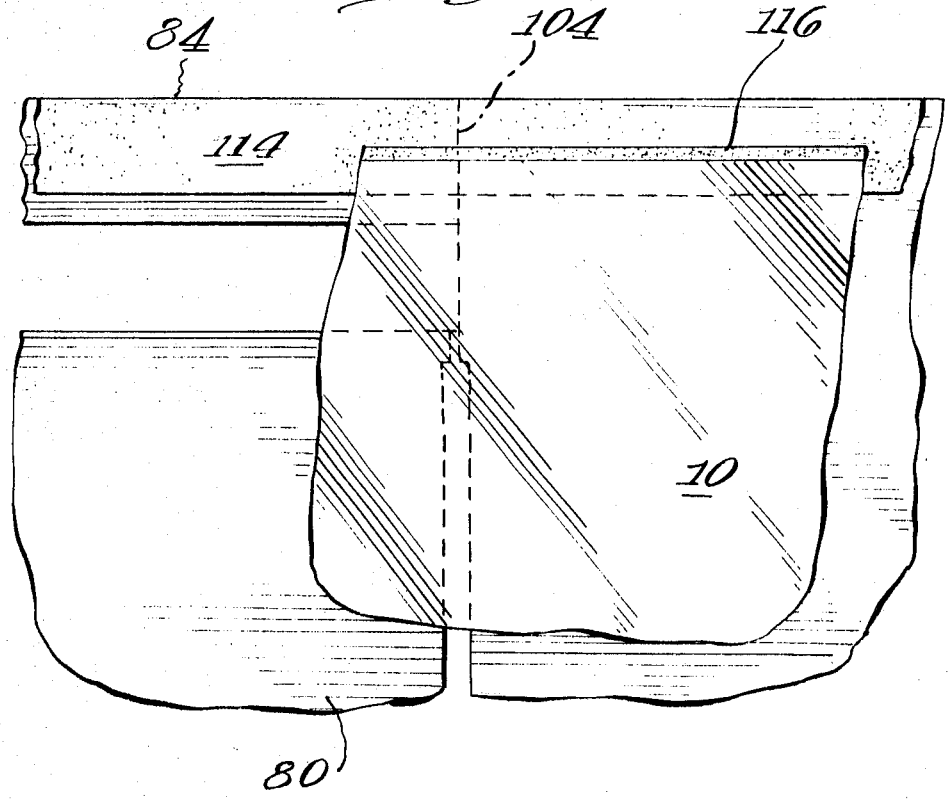
FIG. 18 is a detailed view of the assembly of FIG. 11 showing an intermediate step in the preferred method of securing the membrane to the stiff backing.
Figure 19:
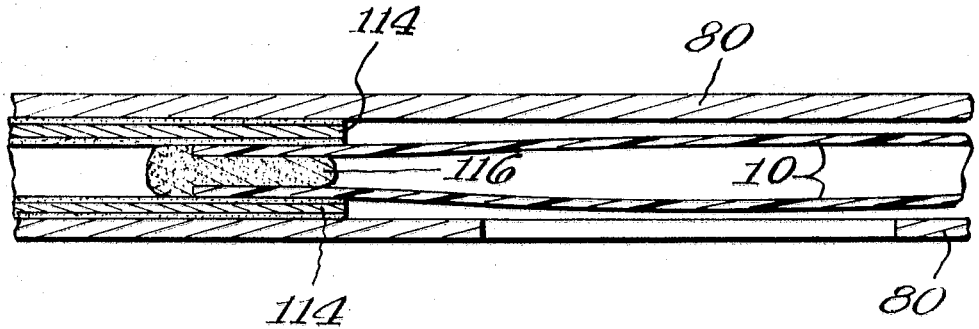
FIG. 19 is a partial sectional view of the structure of FIG. 18 after folding taken through a plurality of folded membrane and backing layers, showing construction details of the finished seal between the membrane and the stiff backing.

Referring to FIGS. 18 and 19, a desirable technique for taping a membrane 10 to the backing 80, is disclosed. The adherence of the membrane to the backing can be a difficult problem, particularly in the case where cellulose membranes are used, since cellulose generally adheres poorly to plastic materials. (Even when the backing is made of cardboard, it may have a plastic coating.) The technique shown is to lay tape or another adhesive bead 114 which is adherent on both sides along each longitudinal edge 84 of the backing 80. Following this, an edge of membrane 10 is placed on the tape and gently pressed down. Thereafter, a curable, flexible adhesive, such as silicone rubber room temperature vulcanizing elastomer, is placed as a bead 116 along the upper sticky side of tape 114 to cover the edge of membrane 10 lying on tape 114. Following this, the backing 80, membrane support, and membrane 10 are folded together in the usual manner along transverse lines of folding 104 to encase and squeeze the uncured bead of sealant 116 between folds of membrane 10. This provides a good lateral seal to each pocket defined by membrane 10 after the folding. The edges of membrane 10 are in turn bracketed by lengths of tape 114, which in turn is bracketed by the edge of backing 80, to form a strong, leakproof seal. The membrane, even though it may not have a high degree of adhesion to sealant 116, is held in place by a pressure seal after sealant 116 has cured in the folded position.

Referring to FIGS. 20–24, alternate embodiments of the mass transfer device of this invention are shown.

In FIG. 20, an alternate stiff backing 122 for replacement of backing 80 is shown having longitudinally extending cutaway portions 128, each extending across only a portion of each panel 130, 131 and separated by webs 129. The pattern of cutaway portions in adjacent panels 130, 131 is different, so that on folding of the panels, continuous flow channels extending across the entire longitudinal dimension of the panels are cooperatively defined by the cutaway portions of adjacent panels. This is best illustrated in FIG. 22.

The advantage of this arrangement is that uniform, symmetrical flow paths for fluid into the pockets are formed without substantially weakening the strength of the stiff backing 122. This strength is particularly desirable during the step of folding the composite of stiff backing 122, spacer 120, and membrane 124 overlying spacer 120 (shown in FIG. 21 with all but a fragment of membrane 124 broken away) into its folded, operative configuration. If a large number of these devices are to be quickly folded on a routine, production-line basis, the backing must have sufficient stiffness, despite the presence of cutaway portions, so that it spontaneously and uniformly folds up along its lines of scoring 126, rather than at some other place on the stiff backing.

The particular embodiment shown in FIGS. 20 and 21 is particularly useful when the mass transfer device is designed to have a high flow resistance (pressure drop) between the ends of each pocket 132, 134. In this instance, because of the high flow resistance, it is unnecessary to provide a large area of reduced pressure, and only narrow cutaway portions 128 are necessary in order to provide adequate amounts of uniformly distributed fluid to the pockets. As added advantages of this configuration, there is less enlargement of the blood film thickness because of the smaller area of cutaway portions 128, and thus the priming volume in the blood path is reduced. The arrangement finds special advantage for use with thin membranes made of porous, hydrophobic film, such as polytetrafluoroethylene, about 3 to 4 mils thick, having a typical pore size of about one-half micron. Such membranes have been found to exhibit highly superior mass transfer properties for carbon dioxide and oxygen.

In this embodiment, the screening strip 120 can be wide enough to overlie the thin cutaway portions 128 to enlarge the area of optimum mass transfer, since the cutaway portions 128 are thin enough to prevent the settling of strip 120 therein.

Figure 23:
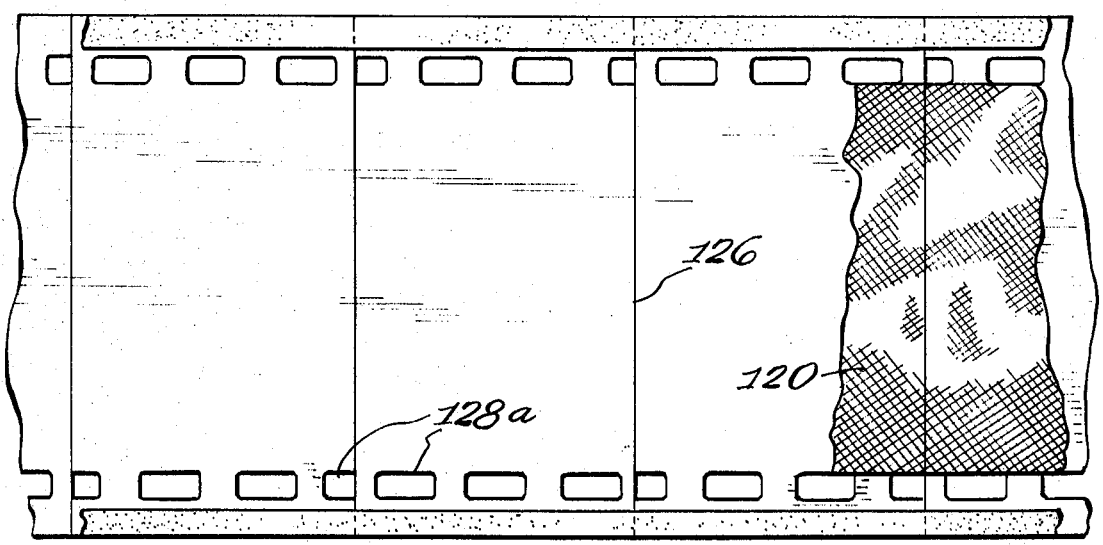
FIG. 23 is a detailed plan view of another embodiment of the stiff backing used in this invention.

Referring to FIG. 23, another embodiment of stiff backing useable in this invention is shown having the same fold lines 126 and the same general pattern of longitudinally extending cutaway portions 128a as shown in FIG. 20. However, the cutaway portions 128a are of increased width when compared with cutaway portions 128 of FIG. 20. This configuration had advantage for use when the pressure drop across each pocket 132, 134 is relatively low. Due to the enlarged area of the cutaway portions, an enlarged path of reduced resistance is provided for the blood leading to the bottom of each pocket on the blood side, and enlarged flow paths for gas into their corresponding pockets are also provided. This provides low flow resistance and increased amounts of fluid to the pockets as is desired to avoid preferential flow paths when the resistance across the pockets is relatively low. Typically, mass transfer devices with silicone rubber membranes are preferably used with the type of spacer shown in FIG. 23.

Figure 24:
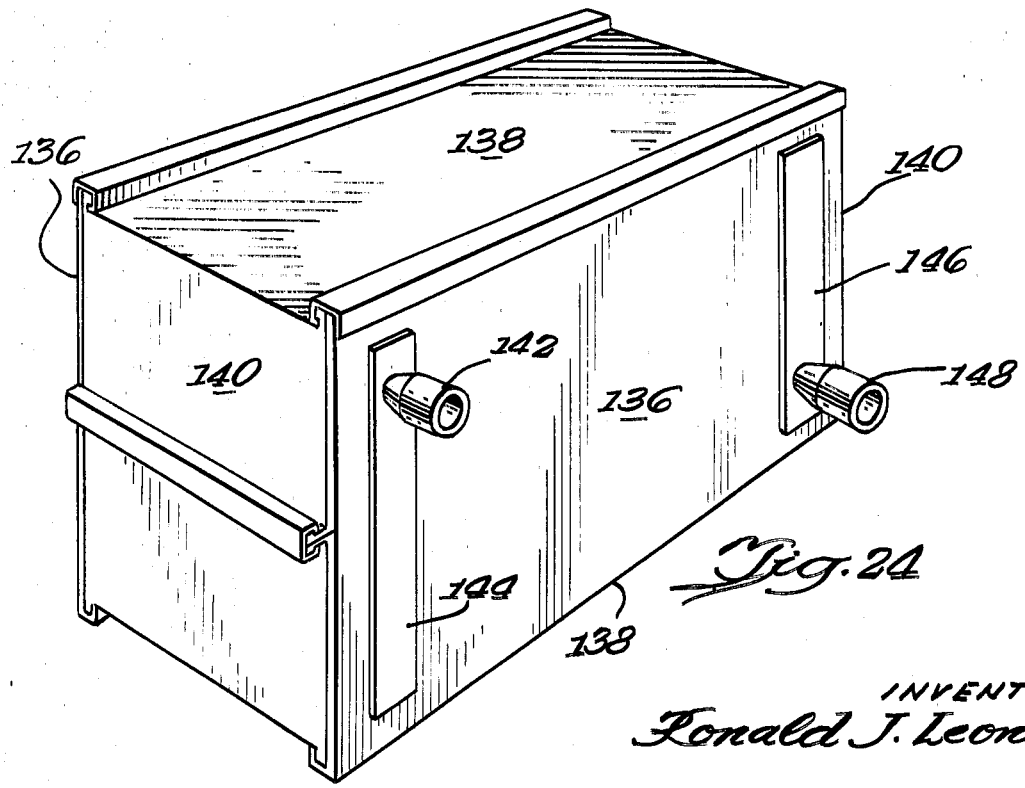
FIG. 24 shows an alternative outer casing which can be utilized to hold the components disclosed herein.

Referring to FIG. 24, an alternate embodiment for an outer casing of the device of this invention is shown. The casing has a pair of side walls 136, top and bottom walls 138, and end walls 140, conventionally attached together by slide fasteners to form a sealed container. Blood inlet 142 is connected to a transverse channel 144 which communicates to the mouths of all pockets 132 (FIG. 21) on the blood side of the folded membrane device. Blood is then collected in transverse channel 146 from the pockets and expelled from the device through outlet 148. The other side of the device has a similar inlet, transverse channel arrangement, and outlet, for distributing oxygen gas through pockets 134 and collecting the gas expelled from the oxygenator.

In use, the mass transfer device of this invention can optionally be pressurized with an inflatable shim to counteract the pressure of blood and oxygen in the pockets of the folded membrane and backing, which tends to push the folded membrane and backing apart, increasing the width of the flow path. The best results are generally achieved when a positive pressure is exerted on the device to keep the flow paths narrowed to a predetermined width.

If desired, clusters of mass transfer devices of this invention can be used by stacking the devices adjacent one another and simultaneously piping the blood and oxygen or dialyzate to the appropriate inlets of the devices, and collecting the respective fluids from the outlets.

The above has been presented for purposes of disclosure only, and is not to be construed as limiting the scope of this invention, which is defined by the claims below.

The mass transfer device herein described will generally comprise a disposable unit in an ordinary oxygenator housing, container, or bracket, and can be similarly employed as a disposable unit in a complete artificial kidney machine in which the manifolding or distributions of fluids is carried out by conventional means.

I claim:

1. In a mass transfer device having as mass transfer means a flexible semipermeable membrane folded to provide a plurality of membrane layers arranged for flow of a fluid in a plurality of parallel first flow paths and for flow of another fluid in a plurality of parallel second flow paths positioned between and separated from said first flow paths by said membrane, the improvement comprising a stiff, integral backing having transversely extending, generally parallel score lines, and folded on said score lines into sections and arranged on one side of said membrane, said sections being disposed between adjoining membrane layers for support of said layers.

2. The combination of claim 1 in which said membrane and backing are folded to define a set of outwardly opening first pockets on one side thereof and a set of second pockets on the other side thereof opening outwardly in an opposite direction.

3. A combination according to claim 2 in which spacer means for defining flow channels along said membrane layers are disposed between each adjoining segment of said backing and membrane layer.

4. The combination according to claim 3 in which said spacer means comprises a folded strip of unitary, flexible screen of woven strands placed between said folded backing and membrane.

5. A blood oxygenator according to claim 4 for flow of blood and oxygen gas along respective membrane sides, in which the backing is fabricated from paperboard, said backing being disposed on the membrane side intended for contact with oxygen gas.

6. The combination of claim 4 in which said folded backing has port means defined therein to permit the passage of fluid therethrough.

7. The combination according to claim 6 in which the openings of each set of oppositely opening pockets are connected to a separate manifold for controlling fluid flow therethrough.

8. The combination of claim 7 in which the set of pockets defined on the membrane side opposite the folded backing has a flow divider disposed in each of said pockets.

9. The combination of claim 6 in which said membrane is a porous hydrophobic film having a pore size of less than one micron.

10. The combination of claim 9 in which said port means comprises longitudinally extending cutaway portions adjacent the longitudinal edges of said backing to facilitate the introduction of fluid to and from the convoluted space between said membrane and said backing.

11. The mass transfer device of claim 10 in which the longitudinally extending cutaway portions extend across only a portion of said sections, and the pattern of said cutaway portions in adjacent sections of said backing is different whereby, on folding of said backing along said score lines, continuous flow channels extending across the entire longitudinal dimensions of said folded sections are cooperatively defined by the cutaway portions of adjacent folded portions.

12. The combination according to claim 3 in which said spacer means comprises a mesh screen of crossed strands.

13. A blood oxygenator according to claim 12 for flow of blood and oxygen gas along respective membrane sides, in which the backing is fabricated from paperboard, said backing being disposed on the membrane side intended for contact with oxygen gas.

14. The combination according to claim 12 in which said folded backing has port means defined therein to permit the passage of fluid therethrough.

15. The combination according to claim 14 in which the openings of each set of oppositely opening pockets are connected to a separate manifold for controlling fluid flow therethrough.

16. The combination of claim 15 in which the set of pockets defined on the membrane side opposite the folded backing has a flow divider disposed in each of said pockets, said flow divider comprising a mesh screen of crossed strands.

17. In a process for making a mass transfer device of the type having a folded flexible semipermeable membrane defining two sets of oppositely opening pockets forming plural liquid flow paths on each side of said membrane for flow of two separate fluids without intermingling thereof, the improvement comprising the steps of prefolding a transversely scored, flat, stiff backing to define a plurality of pleats having oppositely opening pockets; at least partially extending said backing again to receive an overlying flexible, semipermeable membrane thereon; securing the membrane to said stiff backing in overlying relationship; refolding the backing and membrane to define said plurality of pleats and oppositely opening pockets; sealing the sides of said pockets; and connecting the mouths of each set of pockets to separate inlet and outlet means for flow of the respective fluids.

18. The process of claim 17 characterized by the step of providing apertures in said backing to permit fluid communication therethrough.

19. The process according to claim 18 characterized by the further step of placing a flexible spacer between said backing and membrane to define flow channels between said membrane and backing.

20. The process of claim 19 which comprises inserting flow dividers into said set of pockets which is separated from said flexible spacer by the membrane.

21. An oxygenator and the like of the type comprised of a folded semipermeable membrane for separating a liquid and a gas, respectively, flowing along opposed liquid and gas engaging surfaces thereof with opposite sides sealed together and forming a plurality of interconnected, outwardly opening first pockets and a plurality of interconnected, outwardly opening second pockets defined in said liquid and gas engaging surfaces respectively,
a stiff, integral backing having transversely extending, generally parallel, score lines, said backing being secured along one surface of said membrane and arranged for separating said gas engaging surface from a gas, said backing having port means for passing gas to and away from said gas engaging surface, and spacer means for permitting the flow of gas, along said gas engaging surface between said surface and said backing.

22. A combination according to claim 21 in which said backing is folded with said membrane to form overlaying membrane and backing parts.

23. A combination according to claim 22 wherein said port means are disposed at the openings into the second pockets.

24. A combination according to claim 23 in which the openings to the second pockets are partially sealed between said port means.

25. A combination according to claim 23 characterized by a gas manifold secured over the opening to said second pockets and having gas inlet and gas outlet means arranged adjacent said port means to enable gas flow through said oxygenator.

26. A combination according to claim 25 characterized by flow divider disposed in each of said first pockets.

27. A combination according to claim 26 characterized by a liquid manifold partially sealing said first pockets and having inlet and outlet means arranged for enabling fluid flow through said oxygenator.

28. A combination according to claim 25 characterized by a liquid manifold partially sealing said first pockets and having inlet and outlet means arranged for enabling fluid flow through said oxygenator, in which means are provided to retard gas flow from the inlet to the outlet means without first passing through said port means.

29. In a mass transfer device comprising a semipermeable membrane and impermeable backing folded to define two sets of oppositely opening pockets, said folded backing defining a plurality of panels connected by transverse fold lines, the improvement comprising longitudinally extending cutaway portions in said panels adjacent the longitudinal edges of said panels to facilitate the introduction of fluid to and from the convoluted space between said membrane and said backing.

30. The device of claim 29 in which a strip of screening made of crossing strands is interposed between said backing and membrane, said strip of screening being proportioned and positioned so that the screening does not overlie said longitudinally extending cutaway portions.

31. The device of claim 29 in which adjoining panels each define a longitudinally extending cutaway portion adjacent opposite longitudinal edges of said adjoining panels.

32. The device of claim 31 in which a central transversely extending cutaway portion spaced from the longitudinal edges of said panels is defined at alternate transverse fold lines to permit sealing of paths of low resistance adjacent said fold lines.

33. The device of claim 31 in which each panel defines a pair of said cutaway portions communicating with a pair of cutaway portions in one adjacent panel, said cutaway portions being spaced from the fold line connecting each said panel with the other adjacent panel.

34. The device of claim 29 in which cutaway portions extend inwardly from the longitudinal edges of said backing at alternate fold lines to relieve stress on said membrane when folded with said backing.

35. The device of claim 29 in which alternate panels define a pair of longitudinally extending cutaway portions, each cutaway portion being positioned adjacent a separate longitudinal edge of said backing.

36. A mass transfer device which comprises a folded semipermeable membrane for separating two fluids on opposite sides thereof, said membrane defining a first set of pockets on one side thereof and a second set of pockets on the other side of said membrane to define flow channels for said fluids, and an impermeable backing positioned adjacent one side of said membrane for support thereof, said backing having port means for passing one of said two fluids to and from said membrane for mass transfer, and spacer means positioned between said backing and membrane for permitting fluid flow therebetween.

37. The mass transfer device of claim 36 which is a blood dialyzer utilizing liquid dialyzate.

38. The device of claim 37 in which said spacer means is a strip of nonwoven netting comprising a first set and a second set of parallel strands, each set lying against the other set in a different plane and defining an angle thereto.

39. The mass transfer device of claim 36 in which said port means comprises longitudinally extending cutaway portions in said backing adjacent the longitudinal edges thereof to facilitate the introduction of fluid to and from the convoluted space between said membrane and said backing.

40. The mass transfer device of claim 36 in which said membrane is a porous, hydrophobic film having a pore size of less than one micron.

41. In a mass transfer device comprising a semipermeable membrane and an impermeable backing to said membrane folded to define two sets of oppositely opening pockets, said folded backing defining a plurality of panels connected by transverse fold lines, the improvement comprising longitudinally extending cutaway portions in said panels adjacent the longitudinal edges of said panels to facilitate the introduction of fluid to and from the convoluted space defined between said membrane and said backing, each cutaway portion extending across only a portion of each panel, the pattern of cutaway portions in adjacent panels being different, whereby, on folding of said panels, continuous flow channels extending across the entire longitudinal dimension of said panels are cooperatively defined by the cutaway portions of adjacent panels.

42. The device of claim 41 in which a strip of screening made of crossing strands is interposed between said backing and membrane, said strip of screening being proportioned and positioned to overlie said longitudinally extending cutaway portions, said cutaway portions being sufficiently narrow to prevent the membrane and screening from settling into said cutaway portions.

43. The device of claim 42 in which said membrane is a porous film of polytetrafluoroethylene having a pore size of less than one micron.

44. A mass transfer device which comprises a folded, semipermeable membrane for separating two fluids on opposite sides thereof, said membrane being folded to define a first set of pockets on one side thereof, and a second set of pockets on the other side of said membrane, to define flow channels for said fluids, an impermeable backing positioned adjacent one side of said membrane for support thereof, said backing having port means for passing one of said two fluids to and from said membrane for mass transfer, and means preventing said one of said two fluids from flowing along said backing adjacent fold apexes without passing through said port means.

45. The mass transfer device of claim 44 in which said port means comprises longitudinally extending cutaway portions in said backing adjacent the longitudinal edges thereof to facilitate the introduction of fluid to and from the convoluted space between said membrane and said backing.

* * * * *